March 26, 1968  M. HATTAN  3,375,022
DRIVES FOR BICYCLES
Filed Dec. 14, 1965  2 Sheets-Sheet 1
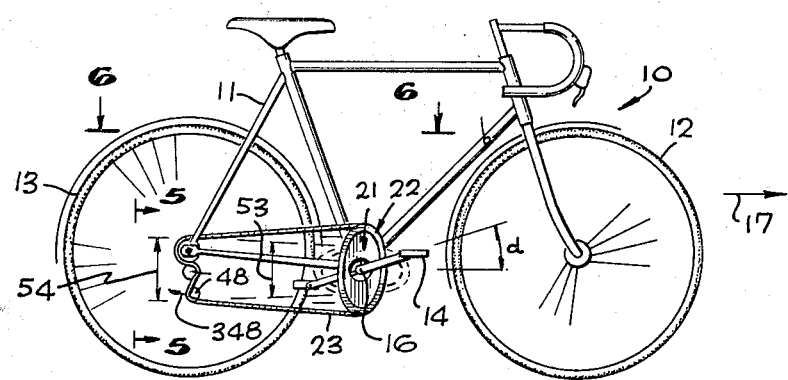
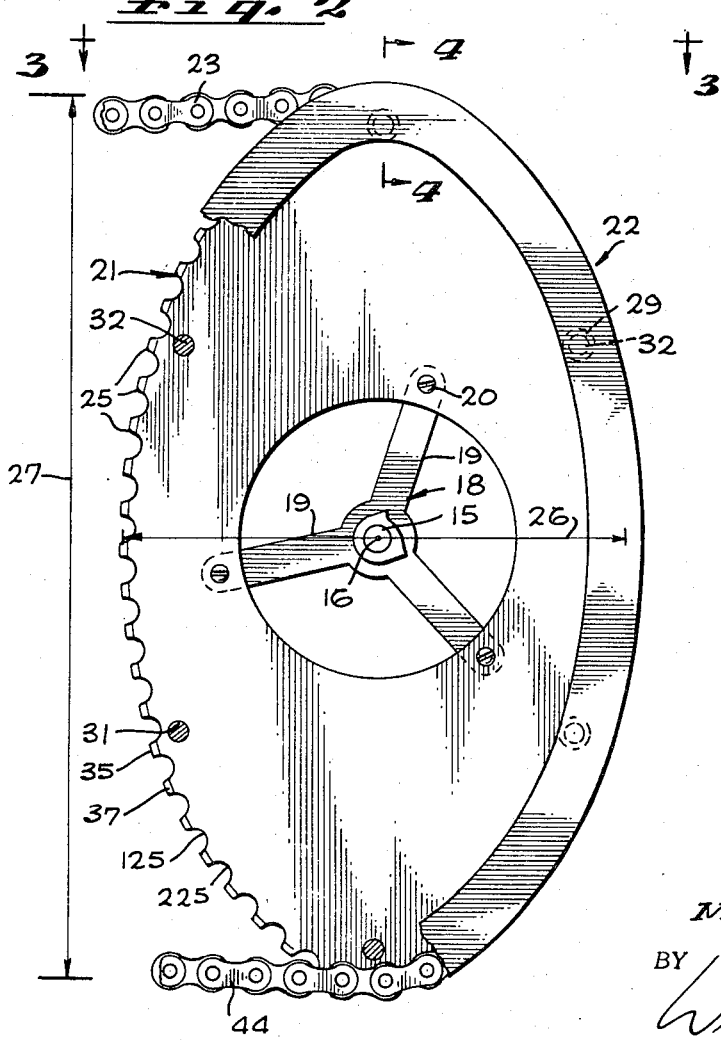
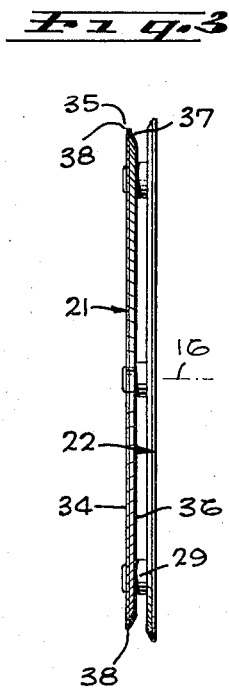
INVENTOR.
MARK HATTAN
BY
William P. Green
ATTORNEY

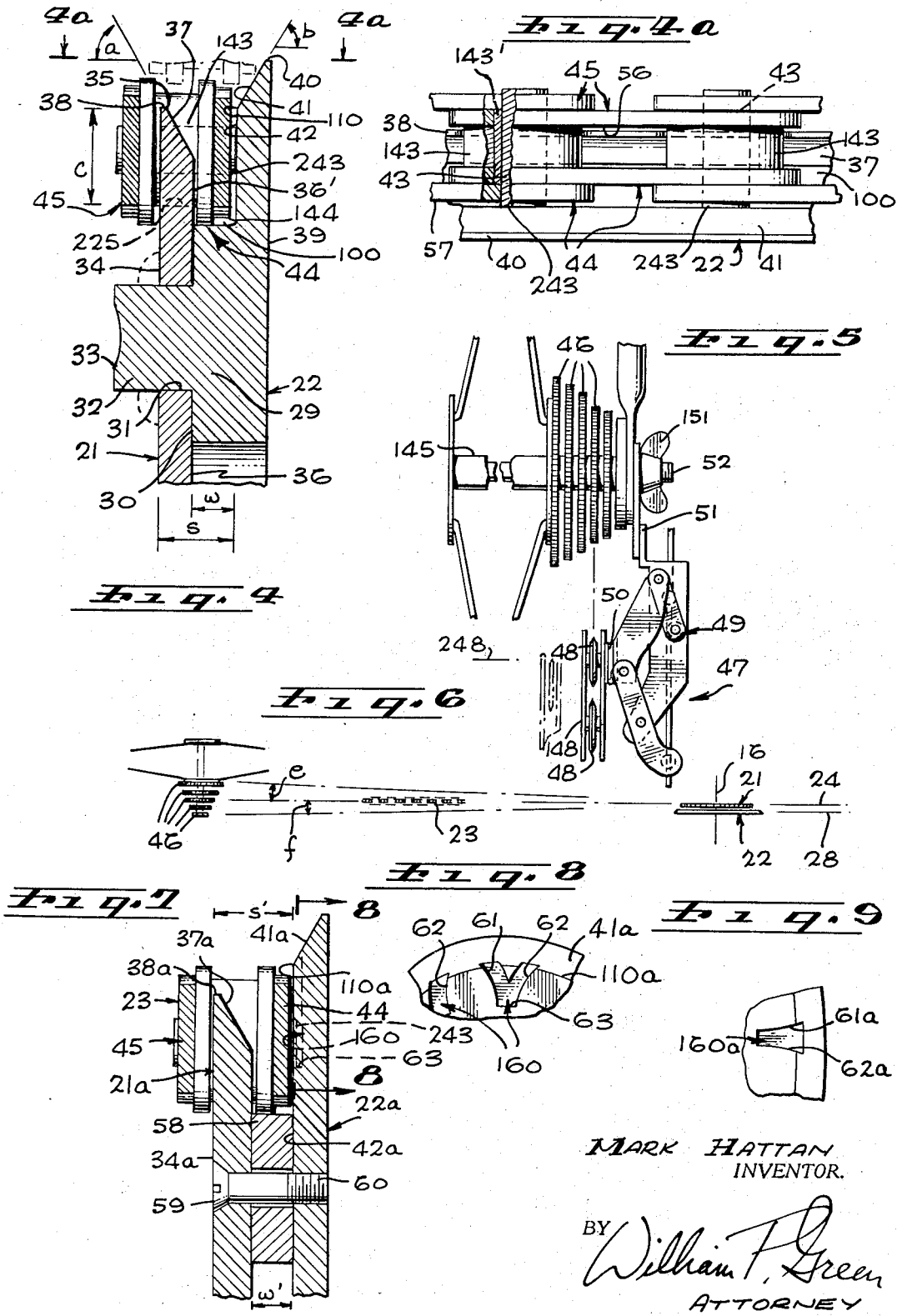

United States Patent Office 3,375,022
Patented Mar. 26, 1968

3,375,022
DRIVES FOR BICYCLES
Mark Hattan, Pasadena, Calif., assignor of one-fourth to
William P. Green, Pasadena, Calif.
Filed Dec. 14, 1965, Ser. No. 513,699
16 Claims. (Cl. 280—238)

ABSTRACT OF THE DISCLOSURE

A bicycle drive having an elliptical main pedal driven sprocket wheel carrying a correspondingly elliptical and slightly oversized deflector at the outer side of the sprocket wheel, with the teeth of the sprocket wheel having camming surfaces for camming an engaged chain laterally outwardly, while the deflector has a camming surface for deflecting the chain in an opposite laterally inward direction.

---

This invention relates to an improved pedal actuated drive for bicycles or the like, of a type utilizing non-circular drive sprockets corresponding generally to those shown in my copending application Ser. No. 416,978, filed Dec. 9, 1964, on "Bicycle Drive," now Patent No. 3,259,398.

In a drive embodying the invention, the main pedal driven sprocket wheel is of oblong, preferably elliptical, configuration, so that as the sprocket wheel turns it varies progressively in effective diameter in a manner automatically compensating for the variations in available torque derived from the pedals. When the pedals are moving primarily vertically, the available torque which may be exerted by a rider is relatively great, but when the pedal movement is generally horizontal, at the top and bottom of the pumping stroke, very little force can be exerted by the rider's legs, and consequently the available torque at the pedal shaft is very small. The oblong sprocket wheel automatically functions as a large diameter wheel when maximum torque is available, and as a smaller diameter wheel when minimum torque is available, and progressively changes in diameter between these two conditions, to thus always maintain an optimum relationship between available torque and effective wheel diameter.

In a drive utilizing an oblong sprocket wheel of this type, great difficulty can be encountered in attempting to prevent the drive chain from jumping off of the sprocket wheel in operation. The continual change in effective diameter of the oblong sprocket wheel causes the upper and lower runs of the chain to continually move up and down as the sprocket wheel turns, in a manner tending to develop a whipping action which may at certain speeds displace the chain from the sprocket teeth. This effect is increased if the main forward oblong sprocket wheel does not lie in precisely the same plane as the rear sprocket wheel which is driven by the chain. In a deraileur type bicycle having a plurality of rear sprocket wheels at axially spaced locations, it is impossible to have more than one of these multiple sprocket wheels aligned with the forward oblong wheel, and consequently in this type arrangement the chain must necessarily under certain circumstances advance angularly from one of the rear sprocket wheels to the forward wheel.

A major object of the present invention is to provide improved and simplified means for preventing the chain from jumping off of the forward oblong sprocket wheel under any operating conditions. Particularly contemplated is an arrangement in which the primary apparatus for preventing such jumping of the chain is actually carried by the forward sprocket wheel itself, to thus facilitate mounting of the sprocket wheel and associated apparatus as a unit to the bicycle. Further, the apparatus utilized for this purpose is designed to serve a secondary function of preventing contact of the pants of a rider with the sprocket teeth or chain, so that the pants can not become caugh in the chain.

The above objects are attained by providing the oblong sprocket wheel with a deflector structure which coacts with the sprocket wheel in a manner deflecting the chain laterally onto the sprocket wheel under certain operating conditions. More particularly, this deflector structure has a camming surface which is near and faces generally axially toward the teeth of the oblong sprocket wheel, and which advances in an axial direction toward the teeth as the camming surface advances radially inwardly. This surface then functions to deflect the chain laterally as the chain advances onto the adjacent teeth of the oblong sprocket wheel, so that even if the chain approaches the wheel at an angle to the plane of the wheel, proper interengagement of the chain with the teeth is assured. Preferably, the teeth also have camming surfaces, which face generally axially toward the deflector structure, and are tapered in the opposite direction to advance generally axially toward the deflector structure as they advance radially inwardly, so that these tooth surfaces cam the chain in an opposite axial direction as it moves into engagement with the teeth. Thus, the cam surfaces on the deflector structure and the teeth will function together to compensate for any out of line condition, and to cam the chain into a proper relationship with the sprocket wheel teeth regardless of the angularity from which the chain approaches the sprocket wheel. It is found that such directing of the chain onto the teeth attains proper interengagement of the chain and teeth in spite of the tendency for a whipping action resulting from the oblong configuration of the sprocket wheel, to thus prevent the chain from ever jumping off of the sprocket wheel. Preferably, the cam surface on the deflector structure is itself oblong, in essential correspondence with the configuration of the sprocket wheel, but is desirably, at all points, at a diameter somewhat greater than the diameter of the tapered camming surfaces on the teeth.

The above and other features and objects of the invention will be better understood from the following detailed description of the typical embodiments illustrated in the accompanying drawings, in which:

FIG. 1 is a side view of a deraileur type bicycle constructed in accordance with the invention;

FIG. 2 is a greatly enlarged side view of the oblong sprocket wheel and deflector element of the invention, with the latter partially broken away to reveal the teeth of the sprocket wheel;

FIG. 3 is a plan view of the sprocket wheel, taken on line 3—3 of FIG. 2, with the chain removed;

FIG. 4 is a greatly enlarged fragmentary section taken on line 4—4 of FIG. 2;

FIG. 4a is taken on line 4a—4a of FIG. 4;

FIG. 5 is taken on line 5—5 of FIG. 1, with the chain broken away;

FIG. 6 is a diagrammatic view taken on line 6—6 of FIG. 1;

FIG. 7 is a view similar to FIG. 4 showing a variational form of the invention;

FIG. 8 is a section on line 8—8 of FIG. 7; and

FIG. 9 is a view taken in the plane of FIG. 8 but at a minimum diameter point on the sprocket.

Referring first to FIG. 1, I have shown at 10 a multiple speed bicycle having a frame 11 to which front and rear wheels 12 and 13 are mounted to turn about parallel transverse axes. The pedals 14 of the bicycle are mounted to the frame for rotation with their shaft 15 about an axis 16 (FIG. 2) disposed parallel to the axis of rear wheel 13, and perpendicular to the direction of movement of the vehicle indicated by arrow 17. Shaft 15 driven by the pedals may carry the usual spider 18 having a series of evenly circularly spaced radially outwardly projecting arms 19 to which there is secured by screws 20 or otherwise an oblong, preferably elliptical, sprocket wheel 21 constructed in accordance with the invention. This sprocket wheel has a deflector element or deflector structure 22 secured thereto, and drives a conventional bicycle chain 23, which in turn drives the rear wheel 13.

Sprocket wheel 21 may be formed of an essentially rigid piece of sheet material, typically aluminum or an appropriate rigid resinous plastic material. The sprocket wheel 21 lies in a plane disposed transversely of axis 16 about which the pedals and sprocket wheel turn, with that plane being designated 24 in FIG. 6. About its periphery, wheel 21 has a series of sprocket teeth 25 formed thereon, which progressively vary in their radial distance from axis 16, between a minimum radius or diameter location designated 26 in FIG. 2, and a maximum diameter or radius location designated 27 in FIG. 2. As viewed when looking axially toward the sprocket wheel in FIG. 2, the configuration of teeth 25 may correspond essentially to the profile of conventional bicycle sprocket teeth.

Deflector element 22 is also generally planar, lying essentially in a second plane designated 28 in FIG. 6, and disposed parallel to plane 24 and perpendicular to axis 16. Deflector 22 is of oblong desirably elliptical configuration, corresponding substantially to the shape of oblong sprocket wheel 21, and may be rigidly secured to the sprocket wheel, as by formation of a series of circularly spaced bosses 29 on deflector element 22. These bosses 29 may form annular shoulders 30 which engage the sprocket wheel about circular apertures 31 in the sprocket wheel, with cylindrical pins 32 projecting through apertures 31 and being upset at their ends 33 from the full line condition of FIG. 4 to the enlarged broken line condition to secure the two parts rigidly together. Deflector element 22 may be formed of an appropriate metal, or of a suitable resinous plastic material having sufficient rigidity or stiffness to maintain the desired shape. It is also contemplated that the two parts 21 and 22 may if desired be molded together from metal or resinous plastic material, as a single structure, in which case bosses 29 would be integral with the material of sprocket wheel 21 and deflector element 22.

To describe further the axial sectional configuration of the sprocket wheel, as viewed best in FIG. 4, it is noted that the sprocket wheel has at one of its sides a desirably completely planar surface 34 disposed directly transversely of axis 16, and which continues in a single plane outwardly to the very periphery 35 of the sprocket wheel, and across the entire area of each of the teeth 25. At its opposite axial side, sprocket wheel 21 has another surface 36, which may be planar and disposed transversely of axis 16 across the entire side of the sprocket wheel, except adjacent the periphery of the wheel, at which location the teeth 25 are tapered to provide camming surfaces 37 (FIGS. 3 and 4), facing generally axially toward the deflector element 22. On each of the various teeth 25, a camming surface 37 having the cross section shown in FIGS. 3 and 4 is formed, with these camming surfaces varying in their radial distance from axis 16 in correspondence with the different radii of the various teeth with respect to that axis. Camming surfaces 37 preferably extend radially inwardly from the outer extremities of the teeth through at least about one-half of the radial extent c of the teeth, as shown. Desirably, each tooth has a short directly axially extending surface 38 at its outer extremity, and tapers inwardly from one edge of that surface. The angle of taper of surface 37, relative to axis 16, designated angle a in FIGS. 3 and 4, may desirably be between about 45 and 75 degrees, preferably approximately 60 degrees. Inwardly beyond tapered surface 37, the teeth have portions of surface 36 at the location designated 36' in FIG. 4, which surface areas extend directly transversely of axis 16.

With reference now to the axial cross sectional configuration of deflector element 22, this part may have the cross section illustrated in FIG. 4, to present at a side facing away from the sprocket wheel a preferably planar surface 39 disposed perpendicular to axis 16 and lying in a single plane entirely out to the short axially extending peripheral surface 40 of this part. Extending radially inwardly from short axial surface 40, deflector element 22 has a tapering camming surface 41, which extends in oblong fashion about axis 16, varying in diameter in correspondence with the changes in diameter of teeth 25 of the sprocket wheel, and which advances progressively axially toward teeth 25 as surface 41 advances radially inwardly. The direction of taper of surface 41 is thus the opposite of the direction of taper of surfaces 37 on the sprocket teeth, and the angle of taper b between surfaces 41 and axis 16 preferably is the same in degrees as angle a, i.e., desirably between about 45 and 75 degrees, and for best results approximately 60 degrees. Tapered camming surface 41 may be disposed radially outwardly of surface 37 of the teeth, as will be apparent from FIG. 4, with the inner extremity of surface 41 desirably having at least about as great a diameter as, or a greater diameter than, the outer extremity of surface 37, in any particular axial plane. Inwardly beyond tapered surface 41, deflector element 22 may have a planar surface 42 disposed parallel to and opposite surface portion 36' of the sprocket wheel, to define with this surface portion 36' a peripheral groove into which a portion of chain 23 is receivable.

The chain 23 is a conventional bicycle chain, having a series of parallel cylindrical pins 43 extending transversely of the chain between two spaced series of side plates 44 and 45, with cylindrical rollers 143 disposed rotatably between the two series of side plates and mounted for rotation about sleeves 143' which are received about the pins and interconnect the inner ones of the side plates 44 with the inner ones of the side plates 45. Plates 44 are received within the peripheral groove 100 formed between teeth 25 and the peripheral portion of deflector element 22, as seen clearly in FIG. 4, while rollers 143 and pins 43 extend through the recesses or valleys 125 formed between successive sprocket teeth 25 (the rollers desirably engaging the bottom walls 225 of those valleys as shown). The second series of side plates 45 are located at the opposite side of the sprocket wheel teeth. The spacing between the sprocket wheel and deflector element 22 is such as to allow this interrelationship between the sprocket wheel, deflector element, and chain, and to enable the chain to be cammed by surfaces 37 and 41 into the specified relationship with the other parts without binding at any point.

Hub 145 of the rear wheel 13 of the bicycle carries this wheel 13 and also a series of parallel drive sprockets 46 of different diameters, for varying the speed of drive of the bicycle. Chain 23 extends selectively about any one of these different sprocket wheels 46, and then extends downwardly about a take up, spreading, and shifting mechanism 47, which may correspond structurally to any of various known types of conventional shifter devices.

Mechanism 47 includes two small idler wheel 48 about which chain 23 extends, and which are mounted by a parallelogram mechanism 49 which under manual control will shift the wheels 48 into the plane of any one of the different sprockets 46, to move the chain into engagement with that sprocket. Idlers 48 and their carrier 148 are yieldingly urged in a direction to take up any looseness in chain 23, as by pivotal movement of the carrier about the axis 248 of the upper idler (FIG. 5), in the direction designated 348 in FIG. 1, and under the influence of a spring 50. The parallelogram mechanism 49 may be mounted in the illustrated depending relation beneath sprocket wheels 46 by means of a mounting arm 51 which is rigidly connected by a nut 151 to an end of the nonrotating shaft 52 by which hub 145 is mounted rotatably, with arm 51 projecting downwardly from that shaft.

When the oblong sprocket wheel 21 is in the position of FIG. 1, with its major axis or maximum diameter 27 extending vertically, the upper and lower runs of the chain converge progressively as they advance rearwardly. On the other hand, when the sprocket wheel 21 is turned through 90 degrees from the full line position of FIG. 1, and to the broken line position of that figure, the upper and lower runs of chain 23 contact the minor diameter portions 26 of the oblong sprocket wheel, and therefore diverge as illustrated in broken lines at 53 as they advance rearwardly. To minimize the effective change in length of the chain, it is desired that the vertical spacing 54 between the rear ends of the upper and lower runs of chain 23 be less than the major diameter 27 of sprocket wheel 21, and more than the minor diameter 26 of sprocket wheel 21, and preferably substantially mid-way between these two diameters, as seen clearly in FIG. 1, so that the forward angle of spread of the two chain runs in the full line condition of FIG. 1 corresponds substantially to the forward angle of convergence of the two chain runs in the broken line minimum diameter condition designated 53. The take up, spreader and shifter mechanism 47 need then only compensate for a very small change in effective length of the chain as the effective diameter of the sprocket wheel 21 changes. As indicated previously, this take-up action is attained by spring urged pivotal movement of wheels 48 about the axis of the upper of these two wheels, and in a direction urging the lower of the two wheels rearwardly relative to the upper wheel in FIG. 1. Such take-up action is sufficient to compensate for the discussed very slight change in effective length of the chain, and to also compensate for extension of the chain about different ones of the drive sprockets 46 connected to the rear wheel of the bicycle.

As seen best in FIG. 1, the pedals 14 and their mounting arms preferably trail slightly behind the minor diameter portions 26 of oblong sprocket wheel 21, desirably through an angle $d$ between about 10 and 40 degrees, for best results about 35 degrees. This enables the rider to exert maximum force on the pedals, from the bicycle seat which is disposed rearwardly of the pedals, when the major diameter of the oblong sprocket wheel is in vertically extending, maximum effective diameter condition.

To now describe the manner of use of the bicycle of FIG. 1, assume that the sprocket wheel 21 and deflector element 22 are mounted in the illustrated manner, as are the other portions of the drive mechanism. As a rider actuates pedals 14 about axis 16, the effective diameter of the sprocket wheel changes automatically in correspondence with the amount of available torque which may be transmitted to the wheel through the pedals from the legs of the rider. If the rear end of the chain is in engagement with the left hand one of the rear sprocket wheels 46 of FIG. 5, the chain must then advance forwardly toward sprocket wheel 21 at the slight angle $e$ of FIG. 6 relative to the plane of the sprocket wheel. In this condition, each link of the chain, as it moves downwardly into engagement with a corresponding one of the teeth 25 of the sprocket wheel, contacts camming surface 37 of that tooth (see FIG. 4), to effectively deflect that link laterally into proper engagement with the tooth. More particularly, the inner ones of the side plates 44 of the chain engage surface 37, to deflect the entire chain laterally as necessary to direct side plates 44 into the space between teeth 25 and deflector element 22.

If the shifter mechanism 47 is actuated to move the chain onto the rightmost sprocket 46 of FIG. 5, the chain then advances at a slight angle $f$ inwardly relative to the plane of the sprocket wheel, in which case the outer ones of the various side plates 44 of the chain engage camming surface 41 of the deflector element 22, to progressively be cammed into the space between this deflector plate and teeth 25, to again assure proper interengagement of the chain with each of the teeth of the sprocket wheel. Similarly, the two camming surfaces 37 and 41 may appropriately deflect the chain when the latter is in engagement with others of the rear sprocket wheels 46. Further, it is contemplated that even if the bicycle is of a type having only a single rear sprocket wheel, the camming surfaces 37 and 41 may still be of value in assuring proper movement of the chain into engagement with the oblong forward sprocket wheel, particularly if the rear sprocket is not exactly aligned with the forward sprocket wheel; or, in any bicycle, to overcome possible lateral deflection of the chain by accidental engagement of the right pedal crank with the chain, or by inward or outward deflection of the top of the oblong sprocket due to springing of light weight bicycle frames under strong pedaling.

In order to enable the chain to interfit with the forward sprocket wheel and deflector element in the discussed manner, the peripheral groove 100 formed between the sprocket wheel and deflector element must of course have an axial width $w$ (FIG. 4) which is large enough to accept (that is, is at least as great as the axial extent of) the inner and outer rows of side plates 44 plus the usual slightly extended portions 243 of the pins. This groove width $w$ must also be small enough to permit the second series of side plates 45 to clear the outer extremities 38 of the sprocket teeth when the chain slides down cam surface 41 (with outer bottom edges 144 of the outer row of the side plates 44 engaging and being deflected by camming surface 41, as indicated in broken lines in FIG. 4). To achieve this result, I design the parts in the FIG. 4 arrangement so that the dimension designated $s$, representing the combined axial thickness of the peripheral groove 100 plus sprocket teeth 25 (or stated differently the axial spacing between surfaces 34 and 42) is not greater than, and preferably slightly less than, the axial spacing between the innermost surfaces 56 of side plates 45 and the outermost surfaces 57 of the opposed side plates 44. As a result, when portions 144 of side plates 44 reach a position of engagement with portion 110 of the guide plate, directly opposite the outer extremities of teeth 25, the side plates 45 are located far enough to the left in FIG. 4 to pass downwardly along the left side of teeth 25. To define somewhat more broadly the dimension $s$ of FIG. 4, which has the above defined relation to the spacing of the side plates, the dimension $s$ may be considered as the minimum axial spacing between a vertical plane containing the leftmost portion 110 of cam surface 41 and a vertical plane defining the left side of teeth 25 at their peaks. The spacing axially between the two series of side plates 44 and 45 must also of course be great enough to receive therebetween the sprocket teeth 25.

FIG. 7 is a view similar to FIG 4, but showing a variational form of the invention, in which the sprocket wheel 21a and deflector element 22a are both formed of sheet metal or other sheet material, and are spaced apart by circularly offset washers 58 of appropriate thickness, through which screws 59 extend, with the latter being threadedly connected at 60 into one of the two interconnected parts. Cam surface 41a of deflector 22a in FIG. 7 is located radially outwardly beyond the position of surface 41 in FIG. 4, so that the innermost portion 110a of surface 41a in FIG. 7 is at each point positioned radially outwardly beyond the diameter of outer peak surface 38a of an adjacent tooth of the sprocket wheel.

Also, it is noted that in FIG. 7 the inner surface 42a of deflector 22a contains a series of generally radially extending grooves 160, which are positioned to receive the end portions 243 of the chain pins, so that side plates 44 of the chain may directly engage the deflector surface 42a in the FIG. 7 position. At the major diameter locations on oblong deflector 22a, each groove 160 may have the generally V-shaped configuration illustrated in FIG. 8, defining two oppositely curving generally arcuate branches 61 and 62 of the groove which merge together at 63 at their radially inner ends. Each of these branches may be deep enough axially to receive the entire end portion 243 of one of the chain pins, and may be of a width corresponding approximately to the diameter of the pins. As seen clearly in FIGS. 7 and 8, branches 61 and 62 open radially outwardly through cam surface 41a of the deflector, at locations outwardly beyond the location 110a which corresponds to location 110 of FIG. 4.

During rotation of the sprocket wheel and deflector of FIG. 7, as a particular link of the chain engages the sprocket wheel in the region illustrated in FIG. 8, the pin of that link first swings radially inwardly along a curved path into one of the grooves 160 through a first of its branches 61 or 62, and subsequently swings out of that groove through its second branch. As will be apparent, the manner of interengagement of the chain and sprocket wheel causes the pins to inherently follow this V-shaped type of path, and the grooves are therefore shaped to correspond to the natural pin path.

As stated previously, FIG. 8 shows the shape of the grooves 160 at the major diameter portions of the sprocket wheel and deflector. At the minor diameter portions of these parts (see FIG. 9), the pins follow more directly radial paths into and out of grooves 160a, so that instead of having two separate branches, each groove 160a merely widens slightly at its radially outer end, as defined by two diverging opposite side edges 61a and 62a of the groove. The pins then move along one of these curved edges into the groove, and move along the other curved edge in leaving the groove. In advancing between the maximum diameter location of FIG. 8 and the minimum diameter location of FIG. 9, the deflector presents V-shaped grooves which are similar to groove 160 of FIG. 8, but whose branches are received progressively closer together, to ultimately reach the merged single branch condition of FIG. 9, all corresponding to an inherent progressive change in the path of movement of the pins as the diameter changes.

As in the first form of the invention, the various dimensions of the chain and the sprocket-deflector combination in FIG. 7 are so interrelated as to enable the chain to interfit with the sprocket teeth as shown when the side plates 44 slide down either of the cam surfaces 37a or 41a. The width w' of the peripheral groove between the sprocket wheel and deflector is at least as great as the combined thickness of the two rows of side plates 44 at the right side of the chain. The axial spacing s' between left side surface 42a of the deflector and left side surface 34a of the teeth (corresponding to spacing s in FIG. 4) is at least as great as the axial spacing between the chain surfaces corresponding to those designated 56 and 57 in FIG. 4a.

When the chain of FIG. 7 is a standard 3/32 of an inch chain, in which the minimum spacing axially between the two series 44 and 45 of side plates (and therefore the axial length of rollers 143) is 3/32 of an inch, it is preferred that the width of w' of the peripheral groove between the teeth and deflector element be between about .083 inch and .090 inch, desirably about .083 inch, and it is preferred that the axial thickness of the sprocket teeth, and of the deflector plate between surfaces 39 and 42, be between about .070 inch and .090 inch, desirably about .080 inch. For this same chain, it is preferred that the dimension s' of FIG. 7 be between about .167 inch and .177 inch, desirably about .172 inch. The axial depth of each groove 160 should be at least about .032 inch.

I claim:
1. Apparatus comprising a sprocket wheel to be driven rotatably about an axis and having teeth for engaging and driving a chain which has spaced side plates received at opposite sides of the teeth, said wheel being generally oblong so that the radial distance of said teeth from said axis varies between predetermined maximum radius locations and minimum radius locations, and a deflector structure near but offset axially relative to said teeth and adapted to turn about said axis therewith and projecting radially outwardly farther than said teeth, said teeth having camming surfaces facing generally toward said deflector structure which advance progressively axially toward the deflector structure as they advance radially inwardly and which are engageable with a chain as the chain moves onto the teeth, to cam the chain in a first axial direction toward said deflector structure, said teeth as viewed in axial section being unsymmetrical and adapted to cam the chain more in said first axial direction and toward said deflector structure than in an opposite axial direction and away from the deflector structure, said deflector structure having a camming surface which advances progressively axially toward said teeth as it advances radially inwardly and which is engageable with said chain as the chain moves onto said teeth to cam the chain in said opposite axial direction.

2. Apparatus as recited in claim 1, in which said camming surface on the deflector structure is generally oblong and varies in radius essentially in correspondence with said teeth.

3. Apparatus as recited in claim 1, in which said camming surface on the deflector structure, at a particular location about the periphery of the wheel, is at least partially located farther from said axis than are said camming surfaces on the adjacent teeth.

4. Apparatus as recited in claim 1, in which said deflector structure forms a generally oblong structure extending substantially entirely about said axis, said camming surface on the deflector structure being essentially oblong and extending substantially entirely about said axis and being located substantially entirely radially outwardly beyond said cam surfaces of the teeth.

5. Apparatus as recited in claim 1, in which said deflector structure is essentially oblong and spaced axially from said teeth and forms a peripheral radially outwardly facing oblong groove between the teeth and deflector structure.

6. Apparatus as recited in claim 1, in which said teeth have surfaces facing axially away from said deflector structure which lie essentially in a plane disposed transversely of said axis.

7. Apparatus as recited in claim 1, in which said camming surfaces on the teeth and deflector structure are disposed at angles between about 45 and 75 degrees to said axis.

8. Apparatus as recited in claim 1, including mounting apertures in said sprocket wheel for connecting the wheel to a drive pedal structure.

9. Apparatus as recited in claim 1, including a bicycle frame having said sprocket wheel and deflector structure mounted rotatably thereon, pedals for driving said wheel and deflector structure, a chain driven by and engaging said sprocket wheel, a front bicycle wheel, and a rear wheel driven by said chain.

10. Apparatus as recited in claim 1, including a chain engaged with said sprocket wheel, said chain including two laterally spaced series of articulately interconnected side plates and elements extending transversely therebetween for engaging and being driven by said teeth, one of said series of side plates being disposed axially between said teeth and said deflector structure, and the other of said series of side plates being located at a side of said teeth facing away from the deflector structure.

11. Apparatus as recited in claim 1, in which said camming surfaces on the teeth which face generally toward the deflector structure continue at a camming angle through most of the axial thickness of the teeth, said teeth being of substantially non-camming configuration at their opposite sides facing away from the deflector structure.

12. Apparatus comprising a sprocket wheel to be driven rotatably about an axis and having teeth for engaging and driving a chain, said wheel being generally oblong so that the radial distance of said teeth from said axis varies between predetermined maximum radius locations and minimum radius locations, a deflector structure near but offset axially relative to said teeth and adapted to turn about said axis therewith, said teeth having camming surfaces which advance progressively axially toward said deflector structure as they advance radially inwardly and which are engageable with a chain as the chain moves onto the teeth, to cam the chain in a first axial direction toward said deflector structure, said deflector structure having a camming surface which advances progressively axially toward said teeth as it advances radially inwardly and which is engageable with said chain as the chain moves onto said teeth to cam the chain in the opposite axial direction, said deflector structure forming a generally oblong plate-like structure lying essentially in a plane spaced axially from said teeth to form a peripheral groove between said teeth and said deflector structure, said deflector structure being oblong in essential correspondence with said sprocket wheel but of a slightly greater diameter than the sprocket wheel teeth, said camming surface on the deflector structure being oblong and of a diameter essentially greater than said camming surfaces on the teeth, means mounting said deflector structure rigidly to said sprocket wheel and in said spaced relation thereto, said teeth and said deflector structure having surfaces facing away from one another which lie essentially in two spaced planes disposed transversely of said axis, said camming surfaces on the teeth and deflector structure being disposed at an angle of between about 45 and 75 degrees to said axis, and apertures in said sprocket wheel for connecting it to a pedal drive.

13. A bicycle comprising a frame, front and rear ground engaging wheels mounted rotatably to said frame, a forward sprocket wheel mounted to the frame for rotation about an axis and having teeth, a chain driven by and engaging said sprocket wheel, said wheel being generally oblong so that the radial distance of said teeth from said axis varies between predetermined maximum radius locations and minimum radius locations, a deflector structure near but offset axially relative to said teeth and mounted to said frame for rotation about said axis with the sprocket wheel, pedals for driving said sprocket wheel and deflector structure, said teeth having camming surfaces which advance progressively axially toward said deflector structure as they advance radially inwardly and which are engageable with said chain, as the chain moves onto the teeth, to cam the chain in a first axial direction toward said deflector structure, said deflector structure having a camming surface which advances progressively axially toward said teeth as it advances radially inwardly and which is engageable with said chain as the chain moves onto said teeth to cam the chain in the opposite axial direction, a plurality of rear sprockets for driving said rear ground engaging wheel and selectively engageable with the chain, and a spring urged take-up and shifter mechanism beneath said rear sprockets.

14. Apparatus comprising a sprocket wheel to be driven rotatably about an axis and having teeth for engaging and driving a chain which has side plates and pins with end portions of said pins projecting beyond said plates, said wheel being generally oblong so that the radial distance of said teeth from said axis varies between predetermined maximum radius locations and minimum radius locations, and a deflector structure near but offset axially relative to said teeth and adapted to turn about said axis therewith, said teeth having camming surfaces which advance progressively axially toward said deflector structure as they advance radially inwardly and which are engageable with a chain as the chain moves onto the teeth, to cam the chain in a first axial direction toward said deflector structure, said deflector structure having a camming surface which advances progressively axially toward said teeth as it advances radially inwardly and which is engageable with said chain as the chain moves onto said teeth to cam the chain in the opposite axial direction, said deflector structure containing a series of grooves facing toward said teeth and extending generally radially at circularly spaced locations for movably receiving said end portions of the pins.

15. Apparatus as recited in claim 14, in which said grooves are of generally V-shaped configuration, widening as they advance radially outwardly, and having greater widths at said maxium radius locations than at said minimum radius locations.

16. Apparatus comprising a sprocket wheel to be driven rotatably about an axis and having teeth for engaging and driving a chain which has side plates and pins with end portions projecting beyond said plates, said wheel being generally oblong so that the radial distance of said teeth from said axis varies between predetermined maximum radius locations and minimum radius locations, a deflector structure near but offset axially relative to said teeth and adapted to turn about said axis therewith, said deflector structure having a surface facing axially toward said teeth and engageable with said chain and containing a series of grooves facing axially toward the teeth and extending generally radially at circularly spaced locations for movably receiving said end portions of the pins.

References Cited

UNITED STATES PATENTS

| | | | |
|---|---|---|---|
| 358,258 | 2/1887 | Dodge | 74—243 |
| 702,841 | 6/1902 | Williams | 74—243 |
| 885,982 | 4/1908 | Delacroix | 74—243 |
| 1,535,114 | 4/1925 | Edmunds | 74—243 |
| 1,634,646 | 7/1927 | Bens | 74—243 |
| 3,121,575 | 2/1964 | Bourigi | 280—236 |
| 3,181,383 | 5/1965 | Juy | 280—261 X |

FOREIGN PATENTS

| | | |
|---|---|---|
| 910,326 | 1/1946 | France. |

KENNETH H. BETTS, *Primary Examiner.*